United States Patent [19]
Storm et al.

[11] Patent Number: 6,016,312
[45] Date of Patent: *Jan. 18, 2000

[54] RADIOTELEPHONE AND METHOD FOR CLOCK CALIBRATION FOR SLOTTED PAGING MODE IN A CDMA RADIOTELEPHONE SYSTEM

[75] Inventors: Brian D. Storm, Round Lake Beach; Mark J. Callicotte, Oak Park; Stephen V. Cahill, Palatine, all of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,275

[22] Filed: Feb. 28, 1997

Related U.S. Application Data

[63] Continuation of application No. 08/808,275, Feb. 28, 1997.

[51] Int. Cl.[7] .............................. G08C 17/00; H04B 7/216
[52] U.S. Cl. ...................... 370/311; 370/335; 455/38.3; 455/343
[58] Field of Search ................................... 370/335, 342, 370/350, 503, 311, 320, 324, 321; 375/208, 200, 356, 357; 455/38.3, 38.1, 38.2, 343, 574

[56] References Cited

U.S. PATENT DOCUMENTS

| | | | |
|---|---|---|---|
| 5,128,938 | 7/1992 | Borras | 455/343 |
| 5,299,228 | 3/1994 | Hall | 375/1 |
| 5,416,435 | 5/1995 | Jokinen et al. | 327/113 |
| 5,428,820 | 6/1995 | Okada et al. | 455/38.3 |
| 5,491,718 | 2/1996 | Gould et al. | 375/205 |
| 5,566,081 | 10/1996 | Yoshizawa et al. | 455/343 |
| 5,596,571 | 1/1997 | Gould et al. | 370/335 |
| 5,678,227 | 10/1997 | Connel et al. | 370/311 |
| 5,708,658 | 1/1998 | Sugita | 370/335 |
| 5,708,971 | 1/1998 | Dent | 455/38.3 |
| 5,737,323 | 4/1998 | Landdowne et al. | 370/311 |
| 5,740,517 | 4/1998 | Aoshima | 370/311 |
| 5,758,278 | 5/1998 | Lansdowne | 455/574 |
| 5,790,941 | 8/1998 | Peponides | 455/343 |
| 5,815,819 | 9/1998 | Oata et al. | 455/574 |
| 5,842,141 | 11/1998 | Vaihoja et al. | 455/574 |

FOREIGN PATENT DOCUMENTS

| | | |
|---|---|---|
| 2173733 | 10/1996 | Canada . |
| 0 758 768 A2 | 2/1997 | European Pat. Off. . |
| 2 315 194 | 1/1998 | United Kingdom . |
| 2 320 398 | 6/1998 | United Kingdom . |
| WO 98/10609 | 3/1998 | WIPO . |
| WO 98/20620 | 5/1998 | WIPO . |

*Primary Examiner*—Chi H. Pham
*Assistant Examiner*—Steven Nguyen
*Attorney, Agent, or Firm*—John G. Rauch; Brian Mancini

[57] ABSTRACT

A radiotelephone (104) in a radiotelephone system (100) enters a low power sleep mode and times the duration of the sleep mode using a sleep clock generator (205) having a coarse resolution. The radiotelephone synchronizes timing of the radiotelephone to system timing using an oscillator (116) having a fine resolution. The radiotelephone then exits the low power sleep mode synchronized with system timing.

17 Claims, 7 Drawing Sheets

FIG. 1

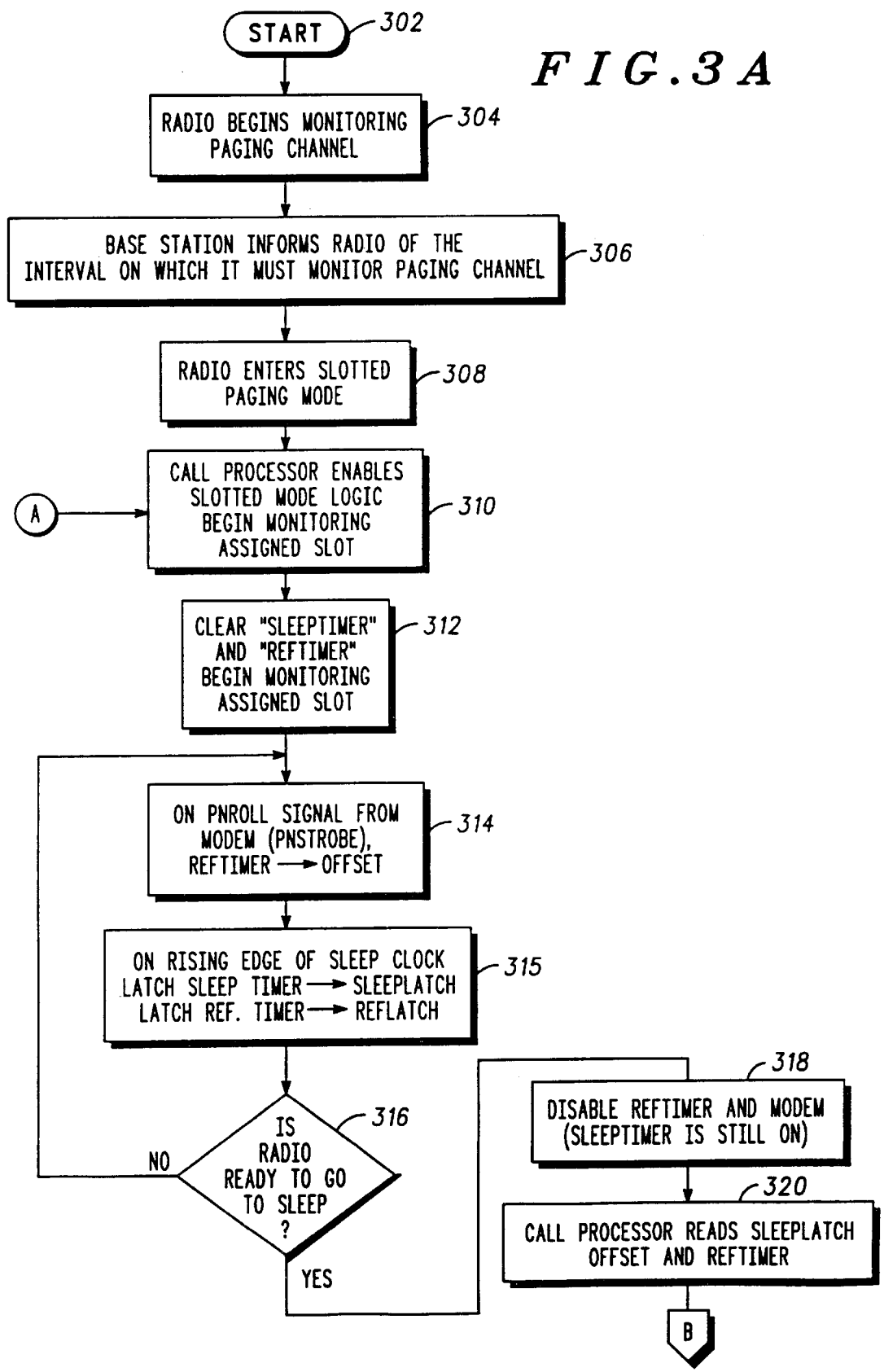

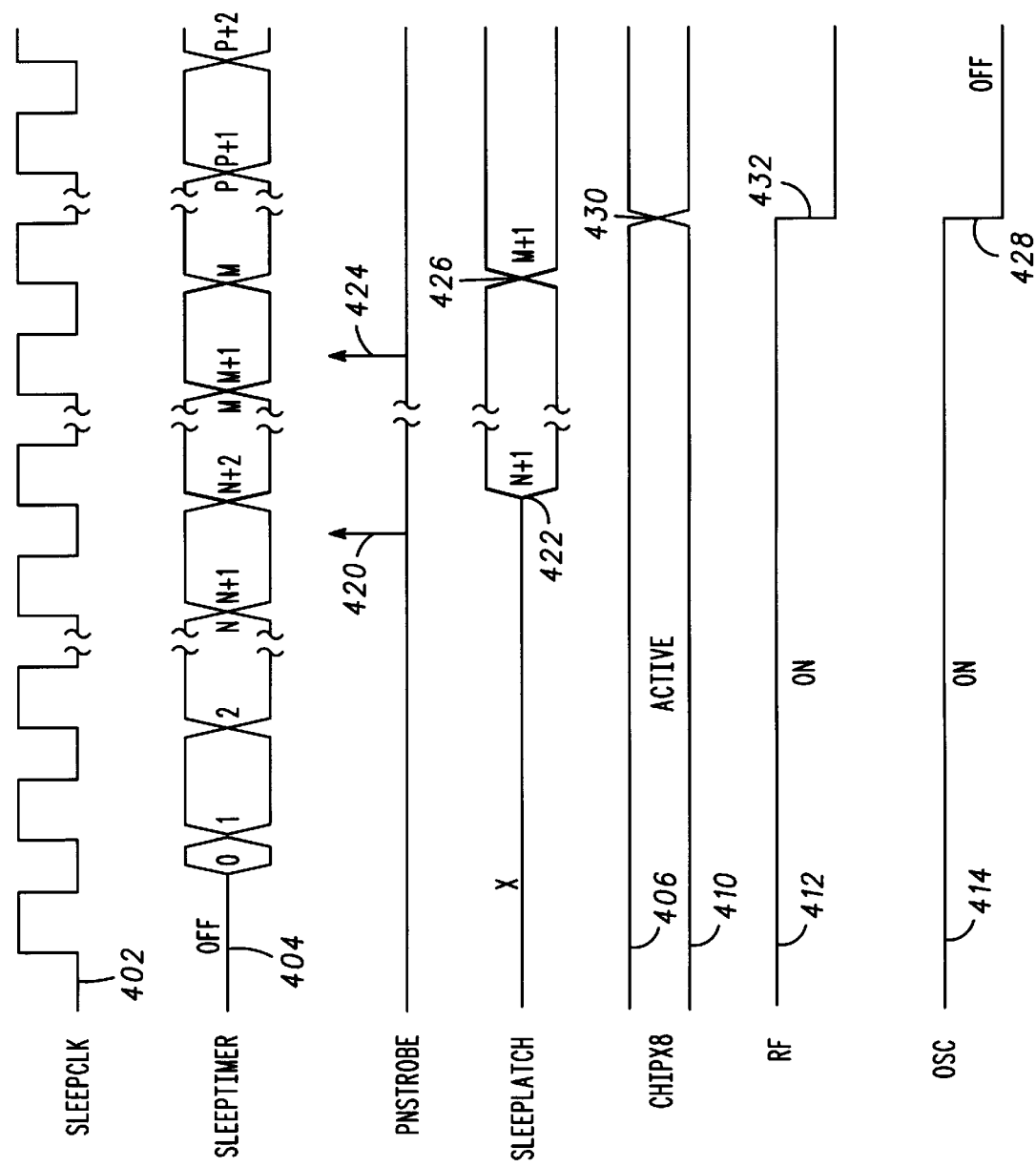

RADIOTELEPHONE AND METHOD FOR CLOCK CALIBRATION FOR SLOTTED PAGING MODE IN A CDMA RADIOTELEPHONE SYSTEM

CROSS-REFERENCE TO RELATED APPLICATIONS

The present application is a continuation of application U.S. Ser. No. 08/808,275, filed Feb. 28, 1997, which is hereby incorporated by reference, and priority thereto for common subject matter is hereby claimed.

FIELD OF THE INVENTION

The present invention generally relates to reducing power consumption in portable radios such as radiotelephones. More particularly, the present invention relates to a method for operating a radiotelephone in slotted paging mode in a Code Division Multiple Access (CDMA) radiotelephone system.

BACKGROUND OF THE INVENTION

Slotted paging mode is a form of discontinuous reception (DRX) operation for a battery-operated mobile radio such as a cellular radiotelephone. The mobile radio is configured for radio communication with one or more remote base stations in a radiotelephone system. In slotted paging mode, when the radiotelephone (also referred to as a mobile station) is in an idle mode (i.e., not engaged in a call), the radiotelephone does not continuously monitor a paging channel but generally remains in a low power state.

Slotted paging mode is critical to the life of the battery of the radiotelephone. The goal of slotted mode operation is to reduce the on time of the radio to a minimum and to power down as much of the radio as possible during sleep periods. In the idle state, the radiotelephone wakes up only during slots preassigned by the radiotelephone system or to process some other condition, such as a user input.

When recovering from a sleep period, the radio must reacquire a radio frequency (RF) link with a base station in the radiotelephone system. Link acquisition and other operations including communication protocols for such a system are defined in an air interface specification. One example of such an specification is Telecommunications Industry Association/Electronic Industry Association (TIA/EIA) Interim Standard IS-95, "Mobile Station-Base Station Compatibility Standard for Dual-Mode Wideband Spread Spectrum Cellular System" (IS-95). IS-95 defines a direct sequence code division multiple access (DS-CDMA or CDMA) radiotelephone system.

To reacquire an RF link, a radiotelephone in a CDMA system must be synchronized with system time, which is the timing maintained by base stations and a network controller in the CDMA system. Timing for the forward link (base station to mobile station) must be maintained by the radiotelephone with the expectation that, when an assigned slot occurs, the radio can wake up quickly, make corrections for timing uncertainties and be ready to acquire and process the paging channel.

Synchronization with the forward link involves alignment of locally generated pseudorandom noise (PN) sequences with PN sequences transmitted by a base station on a pilot channel. The transmitted sequences include a "short PN" sequence which repeats every 26-⅔ ms and a "long PN" sequence which repeats once every 41 days. The radiotelephone contains sequence generators which generate short PN and long PN sequences identical to those used by the base station. The radiotelephone uses a searcher receiver or other mechanism for aligning the short PN sequence with those received from a base station. Once the pilot channel has been acquired, the radiotelephone acquires a synchronization channel and a paging channel. The radiotelephone can then correctly demodulate traffic channels and establish a full duplex link with the base station.

When waking up after a sleep time, the radiotelephone must synchronize with the long PN sequence and short PN sequence. Both the short PN sequence and the frame boundary repeat with reasonable frequency in an IS-95 system. Frame boundaries occur on every third PN roll boundary. A PN roll boundary is defined as the short PN sequence rolling back to its initial value. At the mobile station, the short PN and long PN sequences are generated using a linear sequence generator (LSG). LSGs are described by polynomials and implemented using shift registers and exclusive-or gates. Since the short PN sequence repeats only every 26-⅔ ms, when exiting sleep the LSG can be conveniently stopped at a particular phase in the sequence until the phase correlates with the system PN. The short PN LSG is then restarted, in synchronization with system timing.

The long PN sequence, however, repeats only every 41 days. It is impractical to stop the long PN generator of the radiotelephone (for example, when it is time to sleep), then rapidly clock it to catch up with the system's long PN when it is time to wake up.

Since the short PN sequence and long PN sequence transmitted by the system varying predictably with time, acquiring the PN sequences requires that an accurate time reference be kept at the mobile station during sleep mode. The appropriate PN sequences can be determined for correlation with the system PN sequences upon exit from sleep mode. However, maintaining a highly accurate timing reference requires relatively high power dissipation, which is inconsistent with a low power sleep mode.

In addition to exiting sleep mode during assigned slots, the radiotelephone may also be required to wake up to process or respond to other events occurring asynchronously in the radio. One example of such an event is a user input, such as a keypress of the keypad of the radiotelephone. Response to such an input should be rapid, with no perceptible delay for the user.

Accordingly, there is a need for a method and apparatus for controlling entrance to and exit from slotted paging mode in a mobile station such as a radiotelephone. There is a further need for a low power method and apparatus for keeping accurate time in a mobile station such as a radiotelephone.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 1 is a block diagram of a radiotelephone system;

FIG. 3A and FIG. 3B are a flow diagram illustrating operation of the radiotelephone of FIG. 1;

FIG. 4A and FIG. 4B are a timing diagram for the radiotelephone of FIG. 1; and

DETAILED DESCRIPTION OF A PREFERRED EMBODIMENT

Figure 1:
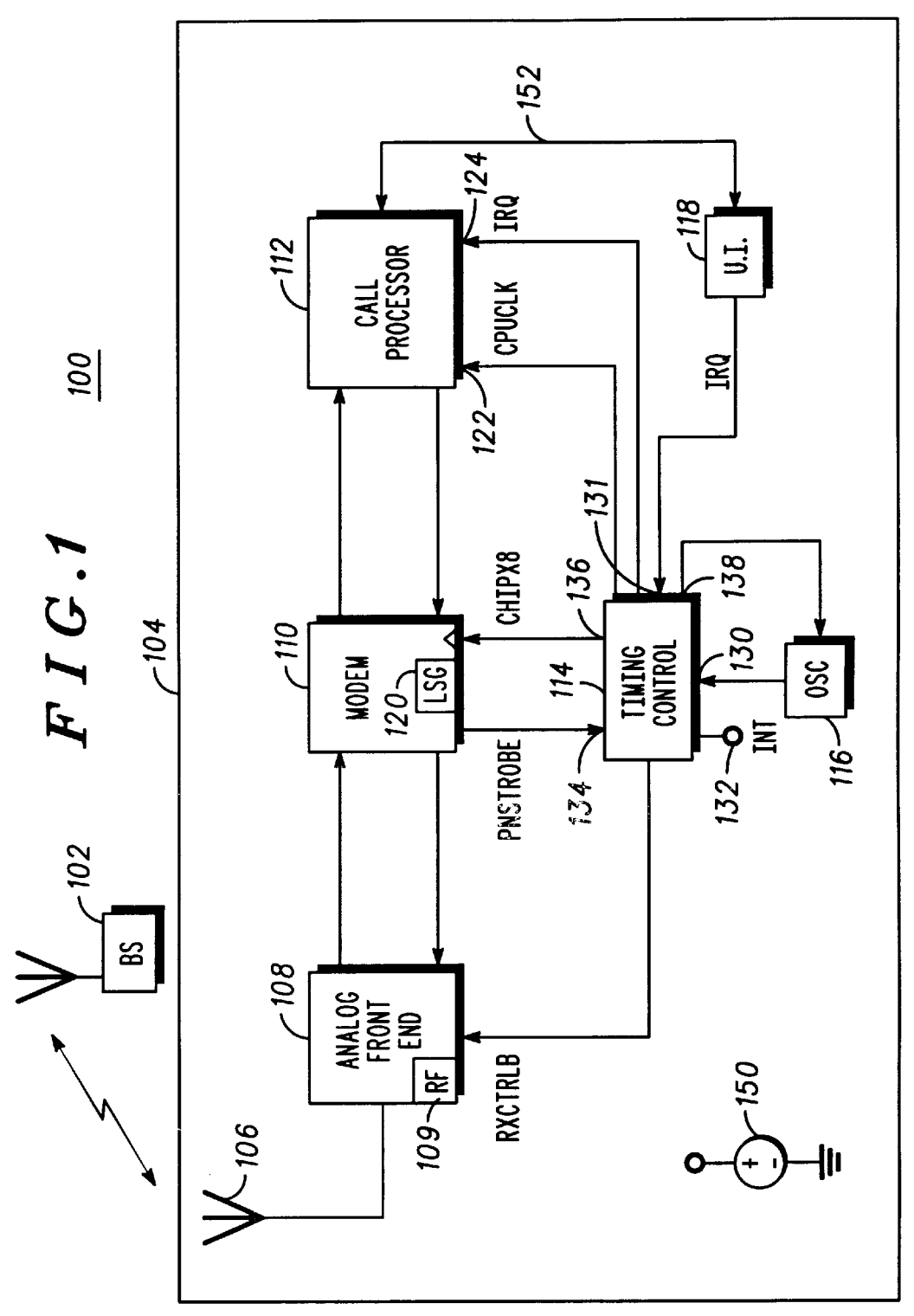
Figure 2:
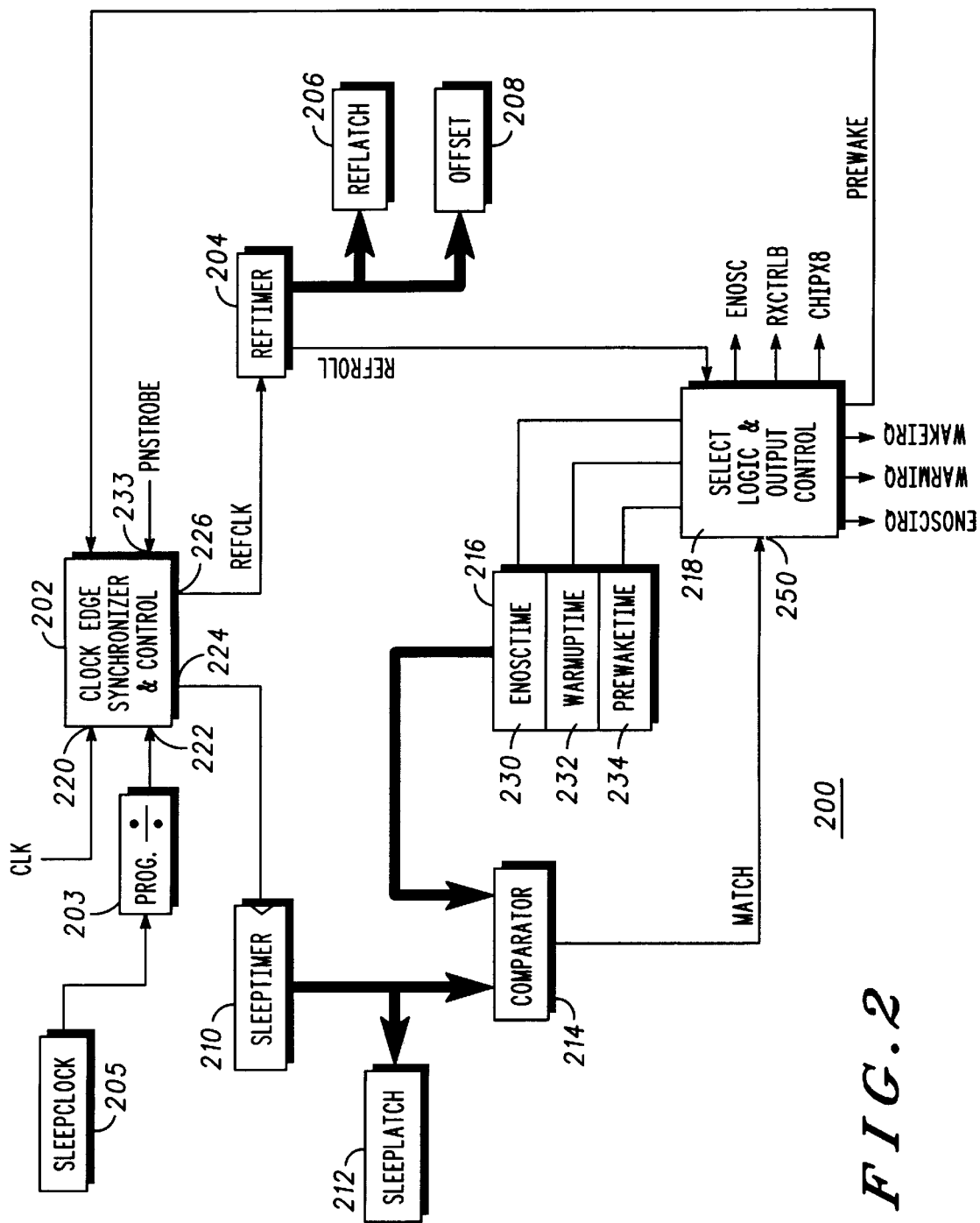
FIG. 2 is a block diagram of a portion of the radiotelephone of FIG. 1.

Referring now to FIG. 1, a radiotelephone system 100 includes a plurality of base stations such as base station 102 configured for radio communication with one or more mobile stations including a Code Division Multiple Access (CDMA) radiotelephone such as radiotelephone 104. The radiotelephone 104 is configured to receive and transmit direct sequence code division multiple access (DS-CDMA) signals to communicate with the plurality of base stations, including base station 102. In the illustrated embodiment, the radiotelephone system 100 is a CDMA radiotelephone system operating according to TIA/EIA Interim Standard IS-95, "Mobile Station-Base Station Compatibility Standard for Dual-Mode Wideband Spread Spectrum Cellular System," operating at 800 MHz. Alternatively, the radiotelephone system 100 could operate in accordance with other CDMA systems including PCS systems at 1800 MHz or with any other suitable digital radiotelephone systems.

The base station 102 transmits spread spectrum signals to the radiotelephone 104. The symbols on the traffic channel are spread using a Walsh code in a process known as Walsh covering. Each mobile station such as the radiotelephone 104 is assigned a unique Walsh code by the base station 102 so that the traffic channel transmission to each mobile station is orthogonal to traffic channel transmissions to every other mobile station. The symbols are spread using a short PN sequence or code, which repeats every 26-⅔ ms and a long PN sequence or code, which repeats every 41 days. Communication on the radio frequency (RF) link between a base station and the radiotelephone 104 is in the form of chips at a chip rate of 1.2288 Mega-chips per second. A chip is a data bit.

The radiotelephone 104 includes an antenna 106, an analog front end 108, a modem 110, a call processor 112, a timing controller 114, an oscillator 116, a user interface 118 and a battery 150. The battery 150 provides operating power to the other components of the radiotelephone 104.

The antenna 106 receives RF signals from the base station 102 and from other base stations in the vicinity. Received RF signals are converted to electrical signals by the antenna 106 and provided to the analog front end 108. The analog front end includes an RF portion 109 including circuitry such as a receiver and transmitter which may be powered down in slotted paging mode. The analog front end 108 filters the signals and provides conversion to baseband signals.

The analog baseband signals are provided to the modem 110, which converts them to streams of digital data for further processing. The modem 110 generally includes a rake receiver and a searcher receiver. The searcher receiver detects pilot signals received by the radiotelephone 104 from the plurality of base stations including the base station 102. The searcher receiver despreads pilot signals using a correlator with system PN codes generated in the radiotelephone 104 using local reference timing. The searcher receiver includes one or more sequence generators such as linear sequence generator (LSG) 120 for generating the PN codes. The modem 110 correlates the locally generated PN codes with the received CDMA signals. The modem 110 detects system timing indicators transmitted by the radiotelephone system 100. Specifically, the modem 110 detects PN rollover boundaries in the CDMA signal and provides an indication of the PN rollover boundaries to the timing controller 114. The modem also includes circuitry for transmitting data from the radiotelephone 104 to base stations such as base station 102. The modem 110 may be constructed from conventional elements.

The call processor 112 controls the functions of the radiotelephone 104. The call processor 112 operates in response to stored programs of instructions and includes a memory for storing these instructions and other data. The call processor 112 has a clock input 122 for receiving a clock signal and an interrupt input 124 coupled to the timing controller 114 for receiving interrupt request signals. The call processor 112 receives from the base station 102 the interval on which the radiotelephone must look for pages. Over this interval, the radiotelephone monitors the paging channel for up to 160 ms and can sleep the remainder of the time. The call processor 112 coordinates the events in the radiotelephone 104 required for entry into and exit from sleep mode. Such events include keeping track of system time, advancing LSG states, restarting the oscillator 116, enabling power to the RF portion 109 in the analog front end 108, and restarting the clock from the timing controller 114 to the modem 110. The call processor 112 is coupled to other elements of the radiotelephone 104. Such connections are not shown in FIG. 1 so as to not unduly complicate the drawing figure.

The user interface 118 permits user control of the operation of the radiotelephone 104. The user interface 118 typically includes a display, a keypad, a microphone and an earpiece. The user interface 118 is coupled to the call processor 112 by a bus 152.

The timing controller 114 controls timing of the radiotelephone 104. In particular, the timing controller 114 controls entry to and exit from slotted paging mode by the radiotelephone 104 and synchronization of local timing of the radiotelephone 104 and system timing of the radiotelephone system 100. The timing controller 114 has a clock input 130 for receiving a clock signal from the oscillator 116, an interrupt input 131 for receiving interrupt requests from the user interface 118, and an interrupt input 132 for receiving interrupt requests from other components of the radiotelephone 104.

The timing controller 114 has a timing input 134 for receiving timing signals from the modem 110 and a timing output 136 for providing timing signals to the modem 110. The timing signals (labeled PNSTROBE in FIG. 1) received from the modem 110 correspond to PN roll boundaries of the radiotelephone's short PN sequence synchronized to the base station. A PN roll boundary is defined as the return of the short PN sequence to its initial value. The PNSTROBE is a series of pulses every 26-⅔ ms synchronized to the PN roll boundary. The timing signals (labelled CHIPX8 in FIG. 1) provided to the modem 110 are clock signals at a rate eight times the chip rate, or 8×1.2288 Mega-chips per second. Other suitable rates may be used. When this timing signal is removed from the modem 110, the modem 110 enters a low power mode and all internal states are frozen.

The oscillator 116 is a reference oscillator for generating a reference clock signal at a first rate. In the illustrated embodiment, the oscillator 116 is a fine resolution clock which produces a highly accurate, fine resolution clock signal such as a 16.8 MHz clock signal. The timing controller 114 has a control output 138 for providing a control signal to the oscillator 116. In response to the control signal, the oscillator 116 is selectively activated and inactivated.

When inactivated, the oscillator enters a low power mode. The timing controller 114 further provides a control signal (labelled RXCTRLB in FIG. 1) to the analog front end 108. In response to this control signal, a portion of the analog front end 108 is selectively powered down.

Referring now to FIG. 2, a sleep time controller 200 of the timing controller 114 includes a clock edge synchronizer 202, a programmable divider 203, a sleep clock generator 205, a reference timer 204, a reference latch 206, an offset latch 208, a sleep timer 210, a sleep latch 212, a comparator 214, registers 216, and select logic 218. Under control of the call processor 112, the sleep time controller 200 places the radiotelephone 104 in a low power sleep mode having a duration based on the timing accuracy of the sleep clock generator 205. In the sleep mode, the sleep time controller 200 simulates system timing until end of the sleep duration determined by the call processor 112 (FIG. 1).

The call processor 112 determines timing of one or more events for reactivating the radiotelephone 104 from sleep mode. In the illustrated embodiment, the call processor calculates an enable oscillator time for restarting the oscillator 116, a warmup time for reactivating a portion of the RF portion 109 of the analog front end 108, and a pre-wake time for restarting a reference timer used for obtaining fine timing resolution necessary for restarting the CHIPX8 clock signal to the modem.

The sleep clock generator 205 generates a sleep clock signal. The sleep clock generator 205 is a coarse resolution clock which generates a coarse resolution clock signal, the sleep clock signal. The sleep clock generator 205 produces the sleep clock signal at a second clock rate which is different from the firs clock rate of the oscillator 116. In the illustrated embodiment, the sleep clock signal is a 32 KHz signal, but any suitable frequency may be used. The programmable divider divides the sleep clock frequency by, for example, powers of 2 in the range 1, 2, 4, . . . 128.

The clock edge synchronizer 202 has a fast clock input 220 for receiving a highly accurate clock signal from the oscillator 116 (FIG. 1), a sleep clock input 222 for receiving the sleep clock signal which has been divided down by the programmable divider 203, and a PN roll input 223 for receiving the PNSTROBE signal from the modem 110 (FIG. 1).

The clock edge synchronizer 202 provides two clock signals. At a first output 224, the clock edge synchronizer 202 provides a sleep clock signal. In the illustrated embodiment, the sleep clock signal is a low speed, coarse resolution clock signal, having a rate of 32 KHz divided by the programmable divider 203. At a second output 226, the clock edge synchronizer 202 includes provides a reference clock signal. In the illustrated embodiment, the reference clock signal is a high speed (e.g., 16.8 MHz), fine resolution clock signal. The reference clock signal is turned off during sleep mode to conserve battery power in the radiotelephone. The clock edge synchronizer 202 synchronizes the various asynchronous clock edges to provide appropriate clock and latching signals.

In addition, the timing controller 114 places a portion of the CDMA radiotelephone 104, including the oscillator 116, in a low power sleep mode. The timing controller 114 times a duration of the low power sleep mode utilizing the coarse resolution clock signal. The clock edge synchronizer 202 synchronizes timing of the CDMA radiotelephone to system timing of the CDMA radiotelephone system using the fine resolution clock signal. The clock edge synchronizer 202 removes the CDMA radiotelephone from the low power sleep mode substantially synchronized with system timing.

In one mode of operation, the timing controller 114 measures duration of one or more of the coarse resolution clock or sleep clock periods using the fine resolution clock signal from the oscillator 116. This is done by counting the number of complete reference clock periods which occur over an integer number of sleep clock periods.

The radiotelephone 104 enters a low power sleep mode for a time duration that is based on sleep clock periods. The measurement of the sleep clock period can be improved by counting a larger number of sleep clock signal periods and reference clock signal periods. The better the measurement accuracy, the longer the time duration of the sleep mode may be extended while still permitting exit from the sleep mode substantially synchronously with a PN roll boundary.

For timing control, the call processor 112 keeps track of PN roll boundaries, too, and uses them to know what the system time is. In order to know the values of the sleep timer 210 and the reference timer 204 at a future action time, the call processor must have four pieces of information. The first is the duration of the one sleep clock period. The second is the system time at the last PN roll boundary. The third is the contents of the sleep timer 210 at the time of the last PN roll boundary. The fourth is the difference between occurrence of the PN roll boundary and the next rising edge of the sleep clock signal. This fourth piece of information is necessary to provide the fine timing necessary to resolve time to an accuracy of a period of the reference clock. To provide this information, the sleep timer 210 counts periods of the sleep clock signal and the reference timer 204 counts periods of the reference clock signal.

The sleep latch 212 is coupled to the sleep timer 210 for storing contents of the sleep timer 210 at a first predetermined time. On rising edges of the sleep clock signal, including as the radiotelephone 104 prepares to enter sleep mode, the current value of the sleep timer 210 is stored in the sleep latch 212. The value is latched just after the rising edge of the sleep clock signal following a PN roll boundary indicated by the PNSTROBE signal at the input 223. This value is used by the call processor 112 to compute wakeup times by storing a copy of the system time. In the illustrated embodiment, the sleep timer 210 and the sleep latch 212 are both 16 bits wide.

The reference latch 206 is coupled to the reference timer 204 for storing contents of the reference timer 204 at the first predetermined time or any suitable time. The current value of the reference timer 204 is stored in the reference latch 206 just after each rising edge of the sleep clock signal following a PN roll boundary indicated by the PNSTROBE signal at the input 223. The reference latch 206 counts the number of reference clock periods that occur over the number of sleep clock periods indicated by the value stored in the sleep latch 212. In the illustrated embodiment, the reference timer 204 and the reference latch 206 are both 24 bits wide.

The offset latch 208 is coupled to the reference timer 204 for storing the contents of the reference timer 204 at a second predetermined time. The value is latched immediately after a PN roll boundary indicated by the PN strobe signal at the input 223. The current value of the reference timer 204 is stored in the offset latch 208 just after the first rising edge of the sleep clock signal following a PN roll boundary indicated by the PNSTROBE signal at the input 223. The value stored in the offset latch 208 is subtracted from the contents of the reference latch 206 to yield the time since the last PN roll boundary. Thus, the offset latch stores a time from a last received system timing reference to the first predetermined time. In the illustrated embodiment, the offset latch is 24 bits wide.

The comparator 214 compares the contents of the sleep timer 210 and the contents of one of the registers 216. The comparator 214 provides a match signal to the select logic 218. The registers 216 store data corresponding to one or more predetermined event times, the predetermined event times corresponding to wake up events. In the illustrated embodiment, a first register 230 stores an enable oscillator time corresponding to a sleep count at which the oscillator 116 is to be enabled. A second register 232 stores a warmup time corresponding to a sleep timer count when a portion of the analog front end 108. A third register 234 stores a pre-wake time corresponding to a sleep clock count when the reference timer 204 is to be reactivated.

Figure 3B:
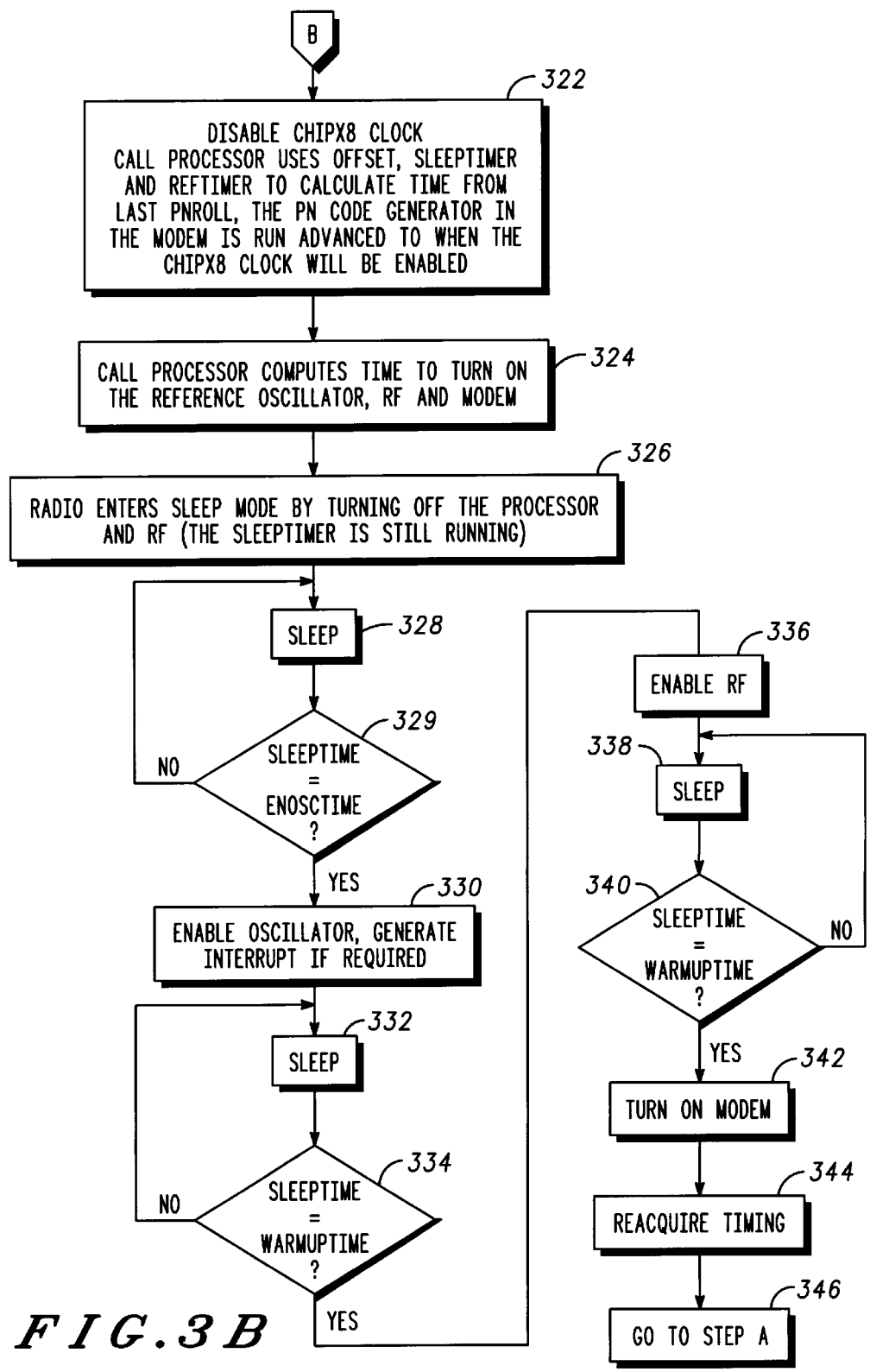

FIG. 3A and FIG. 3B are a flow diagram illustrating operation of the radiotelephone 104 of FIG. 1 for entering and exiting slotted paging mode. FIG. 3A and 3B will be described in conjunction with FIG. 4A and FIG. 4B, which is a timing diagram illustrating timing relationships of signals in the radiotelephone 104 operated in accordance with the present invention. The method begins at step 302.

At step 304, the radiotelephone 104 receives a CDMA signal from a base station and monitors the paging channel for pages directed by a base station such as base station 102 to the radiotelephone 104. Initially, the clock edge synchronizer 202 provides the sleep clock signal 402 at a predetermined frequency, such as 32 KHz, the sleep timer 210 is off 404 and the sleep latch 212 does not contain a valid value 406. Similarly, at the beginning of the method, with the radiotelephone 104 in an active mode, the CHIPX8 clock 408 is active, point 410, RF portion 109 of the analog front end 108 are powered on, point 412, and the oscillator 116 is powered on, point 414. At step 306, the base station 102 informs the radiotelephone 104 of the time interval at which the radiotelephone 104 should wake up and look for pages.

Figure 4B:
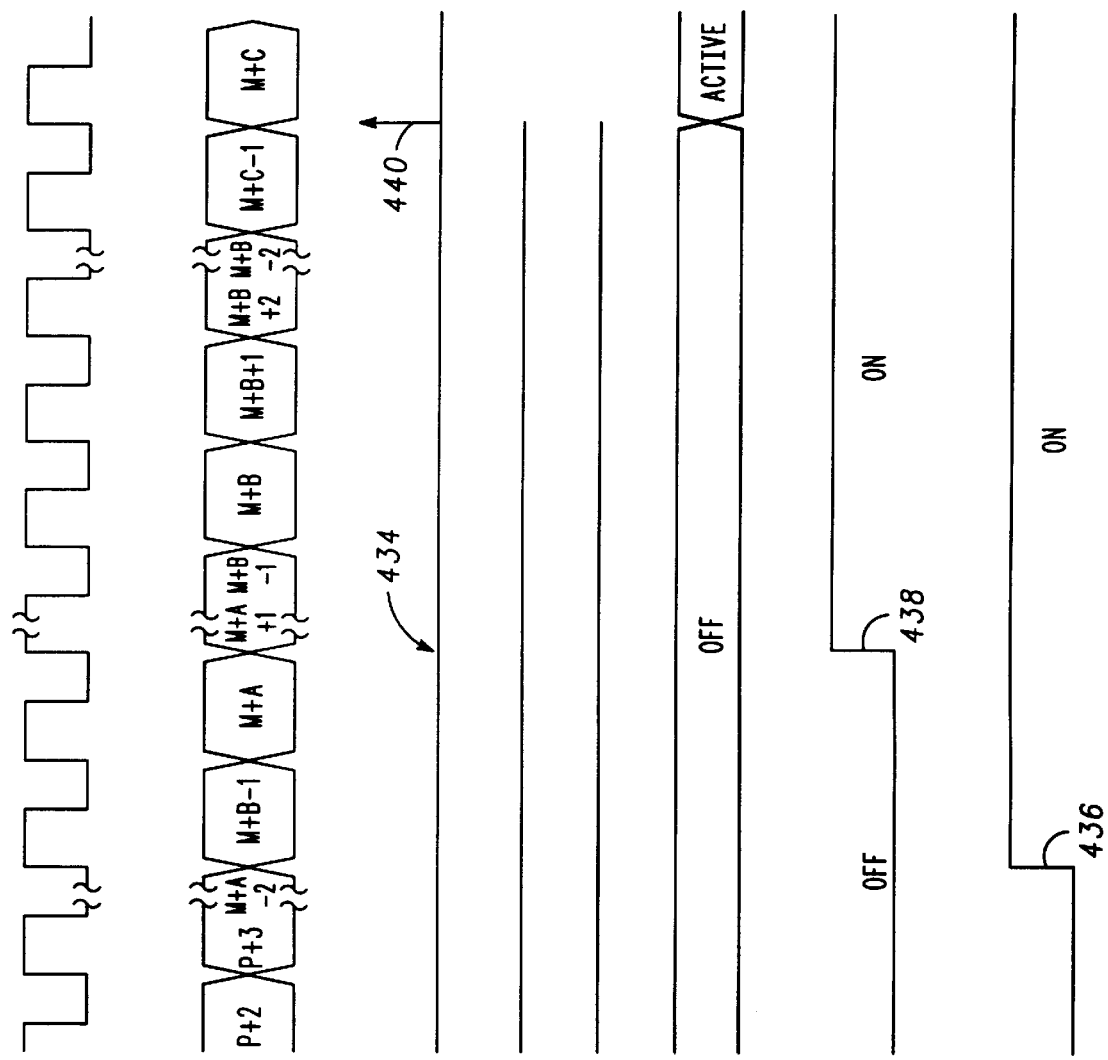

At step 308, the radiotelephone enters slotted mode. At step 310, the call processor 112 enables the slotted mode logic of the sleep time controller 200. At step 312, the radiotelephone 104 resets the sleep timer 210 and the reference timer 204 and begins monitoring its assigned slot. The sleep timer 210 begins counting the number of edges of the sleep clock signal 402. In FIG. 4A and FIG. 4B, the number shown adjacent to the sleep timer edges corresponds to the contents of the sleep timer 210, starting at the reset value 0 and incrementing by one with each rising edge of the sleep clock signal 402. The reference clock signal and reference timer 204 operate in similar fashion.

At step 314, a system timing indicator such as a PN roll boundary 420 is detected. The PN roll boundary 420 and subsequent PN roll boundaries correspond to the PN roll boundaries of system timing. Other system timing indicators may be used, but the PN roll boundaries are well suited because they occur with precise regularity at short period (26-⅔ ms). In response to the PN roll boundary 420, the current value of the reference timer 204 is latched into the offset latch 208 at point 420. At step 315, the first rising edge following the PN roll boundary causes sleep timer value to be latched into the sleep latch 212 and the reference timer value to be latched into the reference latch 206. The radiotelephone 104 operates in a loop including step 314 and step 316 while monitoring the paging channel until, at step 316, the radiotelephone 104 is ready to go to sleep.

At step 316, the call processor 112 determines that it is time for the radiotelephone 104 to go to sleep. At step 318, the call processor 112 disables the reference timer 204 and the modem 110. The RF portion 109 of the analog front end 108 is also powered down, point 432. The sleep timer 210 remains active. At step 320, the call processor 112 reads the value of the sleep latch 212. The call processor 112 also reads the values in the offset latch 208 and in the reference timer 204. These values yield the time of the previous PN roll boundary 424. The call processor 112 then determines a wakeup time. The call processor 112 calculates one or more wakeup times for exiting the sleep mode. The call processor 112 computes the times the timing controller 200 should wake up different parts of the radio and writes data corresponding to those times to the registers 216.

At step 322, the CHIPX8 clock to the modem 110 is disabled. The call processor 112 uses the contents of the sleep timer 210, the reference timer 204 and the offset latch 208 to calculate the time from the last PN roll boundary. Also, the call processor 112 advances the LSG 120 of the modem 110 ahead to the time when the CHIPX8 clock will be restarted.

At step 324, the call processor 112 computes the time to turn on the oscillator 116, the RF portion 109 of the analog front end 108 and the modem 110. The call processor 112 performs timer computations as follows:

wake_time=system time at which the modem 110 will wake up and attempt to reacquire the system.

latched_pn_time=system time of the PN roll on which the contents of the two timers was latched prior to going to sleep.

osc_warm_time=the amount of time the oscillator 116 needs to be on before the output is locked and stable.

RF_warm_time=the amount of time the RF portion 109 of the analog front end 108 needs to be on before providing useful output.

Sleep clock frequency estimate: $f_{sleep}=f_{ref}*$(sleep latch value/reference latch value).

Sleep clock time offset from latched_pn_time to first sleep clock signal edge: $t_{offset}$=offset latch value$*f_{ref}$.

Value to program into the reference timer register: REFTIMER=$(2^{23}-1)$-Truncate[$(f_{ref}*$(wake_time-(pre-wake time/$f_{sleep}$)))].

Value to program into the pre-wake time register: PREWAKETIME=Truncate[(wake_time-(latched_pn_time+$t_{offset}$))$*f_{sleep}$].

Value to program into the warmup time register: WARMUPTIME=PREWAKETIME-Truncate[RF_warm_time$*f_{sleep}$].

Value to program into the enable oscillator time register: ENOSCTIME=WARMUPTIME-Truncate[osc_warm_time$*f_{sleep}$)], Using the timing diagram of FIG. 4A and FIG. 4B, ENOSCTIME=M+A; WARMUPTIME=M+B; and PREWAKETIME=M+C, where A>(P-M)+1, B>A, and C>B.

At step 326, the radiotelephone 104 enters a low power sleep mode. The oscillator 116 is powered down by removing power to the oscillator 116, point 428. The CHIPX8 clock signal from the timing controller 114 to the modem 110 is stopped, point 430. In sleep mode, step 328, any other suitable portions of the radiotelephone 104 are shut down, consistent with the goal of slotted mode operation of reducing the on time of the radiotelephone 104 to a minimum and of powering down as much of the radiotelephone 104 as possible during sleep periods.

The sleep time controller 200 times a sleep duration using a coarse resolution clock. During sleep mode, timing is performed by the sleep timer 210 in response to the sleep clock signal. Thus, in the sleep mode, the sleep time controller 200 simulates system timing until end of the sleep duration defined by the events stored in the registers 216.

While the radiotelephone 104 is asleep, it does not receive any PN roll information in the form of PN roll boundaries, point 434, since the RF portion 109 of the analog front end 108 and the modem 110 are powered down.

During the sleep time, the contents of the sleep timer 210 and the contents of the first register 230 are provided to the comparator 214, step 329. The method remains in a loop including step 328 and step 329. When the contents of the sleep timer 210 equals the contents of the first register 230 (ENOSCTIME), a match signal is provided to an input 250 of the select logic 218. In response, at step 330, the select logic 218 provides a signal (labelled ENOSC in FIG. 2) to restart the oscillator 116, point 436. The radiotelephone 104 continues in sleep mode, step 332.

Subsequently, the contents of the sleep timer 210 and the contents of the second register 232 are compared in the comparator 214, step 334. The method remains in the loop including step 332 and step 334. When the value in the sleep timer 210 equals WARMUPTIME, a signal is asserted to cause clocking signals to be provided to the input 122 of the call processor 112 (FIG. 1) and, at step 336, to turn on the RF portion 109 of the analog front end 108, point 438. The radiotelephone 104 continues in sleep mode, step 338.

Subsequently, the contents of the sleep timer 210 and the contents of the third register 234 are compared in the comparator 214, step 340. The method remains in the loop including step 338 and step 340. When the value in the sleep timer 210 equals PREWAKETIME, a pre-wake signal is asserted by the select logic 218. This indicates the time that the radiotelephone 104 expects to receive its slotted paging mode data. The pre-wake signal is provided to the clock edge synchronizer 202, re-enabling the reference clock signal and starting the reference timer 204. This is synchronized to system timing by synchronizing to a received PN roll boundary 440 received at the PNSTROBE input 223. The reference timer 204 is needed to get the fine resolution necessary to restart the CHIPX8 clock.

The reference timer 204 receives the reference clock signal and counts down the time between the pre-wake time and the wakeup time. When the reference timer 204 rolls over, indicating the wakeup time, the reference timer 204 provides a signal (labelled REFROLL in FIG. 2) to the select logic 218. In response to this signal, the select logic 218 provides a signal to the modem such as CHIPX8. The signal is provided substantially synchronized with a received PN roll boundary. Thus, the sleep time controller 200 synchronized timing of the radiotelephone 104 to system timing using a fine resolution clock, the reference clock signal provided to the reference timer 204.

In response to the reference timer, the CHIPX8 clock signal is provided to the modem, step 342. Since the PN code sequence generators for the short PN sequence and the long PN sequence, LSG 120, have been previously moved forward, the modem 110 can search over a narrow window of time uncertainty in order to reacquire the system and begin decoding the paging channel. The radiotelephone receives its paging information during its assigned paging slot, step 344, then repeats the method, step 346.

Figure 5:
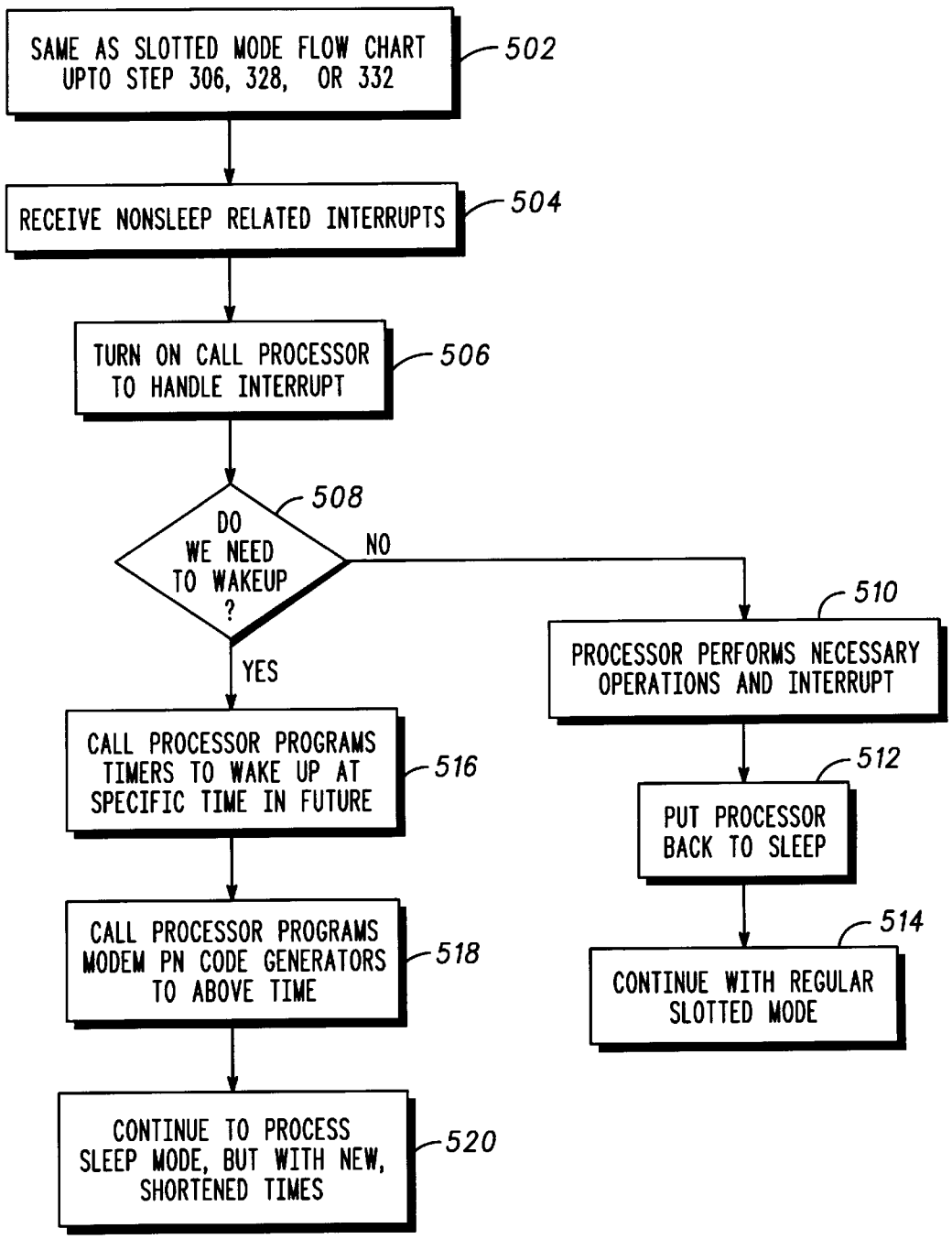
FIG. 5 is a flow diagram illustrating operation of the radiotelephone of FIG. 1.

Referring now to FIG. 5, it shows a flow diagram for a method in accordance with the present invention of processing non-sleep related interrupts in the radiotelephone of FIG. 1 during slotted paging mode operation. As is indicated in FIG. 5, step 502, interrupts are detected and processed at any of step 306, step 328 or step 332 of FIG. 3A and FIG. 3B.

In the illustrated embodiment, the timing controller 114 (FIG. 1) is configured to receive interrupt signals at the interrupt input 132. At step 504, an interrupt signal is received at the interrupt input 132. In response to the interrupt signal, the timing controller 114 activates the call processor 112, for example, by providing clock signals to the input 122 and an interrupt request to the interrupt input 124, to handle the interrupt.

At step 508, the call processor 112 determines if the radiotelephone needs to wake up to process the interrupt. The radiotelephone 104 will have to wake up to process an interrupt, for example that requires the radiotelephone 104 to originate a call or change operational modes. If the radiotelephone does not need to wake up, at step 510 the call processor 112 executes the necessary operations and clears the interrupt request received at the interrupt input 124, step 510. At step 512, the call processor 112 is deactivated, returning to the low-power sleep mode. At step 514, the method continues with regular slotted mode operation described above in conjunction with FIG. 3A and FIG. 3B.

If, at step 508, the call processor 112 determined that the radiotelephone 104 needs to wake up to process the interrupt, at step 516 the call processor 112 determines a point in the future at which the modem 110 will begin monitoring the channel. The call processor 112 programs the sleep timer 210 and the reference timer 204 to wake up the radiotelephone 104 at this new time. At step 518, the call processor programs the LSG 120 in the modem 110 to correspond to the same point in time. At step 520, the radiotelephone 104 continues processing sleep mode as illustrated in FIG. 3A and FIG. 3B, but using the time values and the PN roll boundary determined in step 516 and step 518.

As can be seen from the foregoing, the present invention provides a radiotelephone and a method for operating a radiotelephone in slotted paging mode. Prior to entering a low power sleep state, the radiotelephone calculates the time to wake up and other intermediate times corresponding to wake up events. These include the time to restart an oscillator, the time to activate RF circuitry and the time to start clocking a modem. Also, before entering sleep, the radiotelephone determines the linear sequence generator state required at the wake up time and advances the LSG in the modem ahead to that value. During sleep mode, a sleep timer simulates system timing to provide an indication when to exit sleep mode. Duration of the sleep mode is timed using a coarse resolution clock signal. At the end of the sleep mode, local timing is precisely aligned with system timing using a fine resolution clock signal. Also, the radiotelephone and method provide for immediate processing of non-sleep related interrupts. Thus, the radiotelephone reduces its on time in slotted paging mode to the absolute minimum and powers down as much of the radiotelephone as possible during sleep periods.

While a particular embodiment of the present invention has been shown and described, modifications may be made. It is therefore intended in the appended claims to cover all such changes and modifications which fall within the true spirit and scope of the invention.

What is claimed is:

1. A method for operating a mobile station in a code division multiple access (CDMA) radiotelephone system including a plurality of base stations transmitting a short pseudorandom noise (PN) sequence including a system timing indicator comprising a PN roll boundary of the short PN sequence, the method comprising the steps of:

(a) determining an offset between a fine resolution clock and a coarse resolution clock;

(b) entering a low power sleep mode;

(c) timing a sleep duration using the coarse resolution clock;

(d) synchronizing the fine resolution clock of the mobile station to the PN roll boundary of the short PN sequence by correlating to a short PN sequence generated in the mobile station;

(e) adjusting timing of the mobile station by combining timing of the coarse resolution clock and the offset;

(f) exiting the low power sleep mode with the fine resolution clock synchronized with the system timing indicator.

2. A method as recited in claim 1 wherein step (b) comprises the step of inactivating the fine resolution clock.

3. A method as recited in claim 2 wherein the method further comprises the step of activating the fine resolution clock at a time sufficiently before step (d) to allow the fine resolution clock to stabilize.

4. A method as recited in claim 1, further comprising the steps of:

storing an offset time corresponding to a difference between timing of the system timing indicator and timing of the coarse resolution clock;

determining a wakeup time;

at a prewake time corresponding to the difference in the wakeup time and the offset time, starting a reference timer which expires at the wakeup time; and in response to expiration of the reference timer, exiting the low power sleep mode.

5. A method as recited in claim 4 further comprising the step of configuring the reference timer to expire substantially synchronously with a next received system timing indicator.

6. A method for operating a mobile station in a code division multiple access (CDMA) radio communication system including a plurality of base stations, transmitting a short pseudorandom noise (PN) sequence including a system timing indicator comprising a PN roll boundary of the short PN sequence, the method comprising the steps of:

aligning a short PN sequence of the mobile station with the system timing indicator so as to allow reference clock synchronization;

synchronizing a reference clock signal to the system timing indicator at a first clock rate;

producing a sleep clock signal at a second clock rate, the second clock rate being less than the first clock rate;

measuring timing accuracy of the sleep clock signal using the reference clock signal;

determining an offset between the reference clock signal and the sleep clock signal based on the timing accuracy;

adjusting the sleep clock signal timing by combining the timing accuracy of the sleep clock signal and the offset; and entering a low power sleep mode for a time duration that is based on the adjusted sleep clock signal.

7. A method as recited in claim 6 wherein the step of measuring timing accuracy comprises the steps of:

summing reference clock edges;

summing sleep clock edges; and relating sleep clock edges to reference clock edges to estimate the timing accuracy of the sleep clock signal.

8. A method as recited in claim 7 wherein the step of relating comprises multiplying the first clock rate by a ratio of sleep clock edges to reference clock edges to form an estimate of the second clock rate.

9. A method as recited in claim 6 wherein the method further comprises the steps of producing one or more output timing signals synchronized to the system timing indicator.

10. A method as recited in claim 6 wherein the mobile station includes a reference oscillator for producing the reference clock signal and wherein the step of entering a low power sleep mode comprises inactivating the reference oscillator.

11. A radiotelephone configured for operation in a code division multiple access (CDMA) radiotelephone system including a plurality of base stations, transmitting a short pseudorandom noise (PN) sequence including a system timing indicator comprising a PN roll boundary of the short PN sequence, the radiotelephone comprising:

a PN code generator providing a short PN sequence to align with the system timing indicator;

a reference oscillator for generating a reference clock signal synchronized to the system timing indicator using the short PN sequence from the PN code generator at a first rate;

a sleep clock generator for generating a sleep clock signal;

a reference timer for counting periods of the reference clock signal;

a sleep timer for counting periods of the sleep clock signal;

a controller for determining timing accuracy of the sleep clock generator by relating the periods of the sleep clock signal to the periods of the reference clock signal, the controller determining an offset between the reference clock signal and the sleep clock signal; and a sleep time controller for placing the radiotelephone in a low power sleep mode having a duration based on the timing accuracy of the sleep clock generator, the sleep time controller adjusting the duration by combining timing of the sleep clock signal and the offset.

12. The radiotelephone of claim 11, further comprising a timing controller for producing an output timing signal synchronized to the system timing indicator.

13. A radiotelephone as recited in claim 12 further comprising:

a sleep latch coupled to the sleep timer for storing contents of the sleep timer at a first predetermined time;

a reference latch coupled to the reference timer for storing contents of the reference timer at the first predetermined time; and an offset latch coupled to the reference timer for storing contents of the reference timer at a second predetermined time, the offset latch storing a time from a last received system timing reference to the second predetermined time.

14. A code division multiple access (CDMA) radiotelephone operable in a CDMA radiotelephone system including a plurality of base stations, transmitting a short pseudorandom noise (PN) sequence including a system timing indicator comprising a PN roll boundary of the short PN sequence, the CDMA radiotelephone comprising:

a sleep clock which produces a coarse resolution clock signal;

a PN code generator providing a short PN sequence which is aligned with the system timing indicator;

an oscillator which produces a fine resolution clock signal, the oscillator being synchronized to the system timing indicator using the short PN sequence from the PN code generator;

a timing controller which places a portion of the CDMA radiotelephone including the oscillator in a low power sleep mode, the timing controller determining an offset between the fine resolution clock signal and the coarse resolution clock signal, the timing controller timing duration of the low power sleep mode in response to the coarse resolution clock signal adjusted by combining the coarse resolution clock signal and the offset; and a clock edge synchronizer which synchronizes timing of the CDMA radiotelephone to the system timing indicator of the CDMA radiotelephone system using the fine resolution clock signal, the clock edge synchronizer removing the portion of the CDMA radiotelephone from the low power sleep mode synchronized with the system timing indicator.

15. A CDMA radiotelephone as recited in claim 14 wherein the clock edge synchronizer comprises:

an offset register for storing an offset time corresponding to a difference between timing of a received system timing indicator and timing of the coarse resolution clock signal;

a sleep timer for timing duration of the low power sleep mode and producing a match signal at a prewake time; and a reference timer which times the offset time after the sleep timer produces the match signal, the clock edge synchronizer removing the portion of the CDMA radiotelephone from the low power sleep mode upon expiration of the reference timer.

16. A CDMA radiotelephone as recited in claim 15 further comprising:

a modem for detecting system timing indicators transmitted by the CDMA radiotelephone system, the offset time corresponding to a difference between timing of a last received system timing indicator and a last edge of the coarse resolution clock signal.

17. A CDMA radiotelephone as recited in claim 16 wherein the reference timer expires substantially synchronously with a next received system timing indicator.

* * * * *